United States Patent
Iozsef et al.

(10) Patent No.: US 12,519,543 B2
(45) Date of Patent: Jan. 6, 2026

(54) SIGNAL DETECTION AND INFORMATION CONVEYANCE OVER OPTICAL FIBER

(71) Applicant: MACOM Technology Solutions Holdings, Inc., Lowell, MA (US)

(72) Inventors: Eric Iozsef, Lowell, MA (US); Rajiv Shukla, Lowell, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 249 days.

(21) Appl. No.: 18/224,760

(22) Filed: Jul. 21, 2023

(65) Prior Publication Data

US 2025/0030483 A1   Jan. 23, 2025

(51) Int. Cl.
*H04B 10/40* (2013.01)
*H04B 10/25* (2013.01)
*H04B 10/50* (2013.01)

(52) U.S. Cl.
CPC ......... *H04B 10/40* (2013.01); *H04B 10/2589* (2020.05); *H04B 10/5057* (2013.01); *H04B 10/5059* (2013.01)

(58) Field of Classification Search
None
See application file for complete search history.

(56) References Cited

U.S. PATENT DOCUMENTS

| | | | |
|---|---|---|---|
| 6,690,884 B1 * | 2/2004 | Kelty | H04B 10/695 714/704 |
| 7,272,274 B1 | 9/2007 | Albers et al. | |
| 8,098,993 B2 | 1/2012 | Kirkpatrick et al. | |
| 9,482,833 B1 | 11/2016 | Mann et al. | |
| 2014/0133846 A1 * | 5/2014 | Gao | H04B 10/40 398/16 |
| 2019/0148904 A1 * | 5/2019 | Tanaka | H01S 3/06754 359/341.3 |
| 2023/0187397 A1 | 6/2023 | Or-Bach et al. | |

FOREIGN PATENT DOCUMENTS

EP    2783470 B1    8/2022

OTHER PUBLICATIONS

International Search Report for International Application No. PCT/US2024/034603, mailed Oct. 10, 2024.
Written Opinion for International Application No. PCT/US2024/034603, mailed Oct. 10, 2024.

* cited by examiner

*Primary Examiner* — Darren E Wolf
(74) *Attorney, Agent, or Firm* — Jason H. Vick; Amped IP LLC (57) ABSTRACT

An architecture for peripheral component interconnect express compliant signals over optical fiber is provided. A method includes, based on a first determination that an impedance level of a receiver device satisfies a defined impedance level, causing a driver to pulse at a first defined frequency and duty cycle level. Further, based on a second determination that a number of pulses received, at a transimpedance amplifier, at the first defined frequency and duty cycle level satisfy a defined number of pulses and at least one defined criterion, the method causes a second impedance level of the driver to match the defined impedance level and causes the driver to enter an electrical idle state. The method also includes facilitating, by a transmitter, transmission of data to the receiver device at a second defined frequency level, via an optical fiber link.

20 Claims, 8 Drawing Sheets

SIGNAL DETECTION AND INFORMATION CONVEYANCE OVER OPTICAL FIBER

TECHNICAL FIELD

The subject disclosure relates generally to signal detection, and, in particular, to providing downstream information to upstream components via signals transmitted over optical fiber methods, circuits, and apparatuses related thereto.

BACKGROUND

Traditionally, copper cable is used for various communication systems, including communications systems that have upstream components and downstream components. In some cases, the upstream components should receive information related to the downstream components, and vice versa. Such transfer of information between components that are coupled with copper cable is straight forward and can be communicated directly among the components. However, other types of connections, such as fiber optic cable, electrically isolate such components and direct communication is no longer available. Accordingly, unique challenges exist related to detection and communication exchange.

It is noted that the above-described description is merely intended to provide a contextual overview of circuit design and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In one or more embodiments, provided is a method that includes, based on a first determination that an impedance level of a receiver device satisfies a defined impedance level, transmitting a first signal to a first driver, wherein the first signal causes the first driver to pulse at a first defined frequency and duty cycle level. Further, based on a second determination that a number of pulses received, at a transimpedance amplifier, at the first defined frequency and duty cycle level satisfy a defined number of pulses and at least one defined criterion, the method transmits a second signal to a second driver. The second signal causes a second impedance level of the second driver to match the defined impedance level. In addition, the method causes a second impedance level of the second driver to match the defined impedance level and causes the second driver to enter an electrical idle state. The method also includes facilitating, by a transmitter, transmission of high-speed data to the device at a second defined frequency level, via an optical fiber link, based on the second impedance level of the second driver being determined to match the defined impedance level. The transimpedance amplifier can be electrically isolated from the first driver and the second driver via the optical fiber link.

In an implementation, the method includes, prior to causing the second impedance level of the second driver to match the defined impedance level and based on the second determination and a determination that a near end receiver has been detected, causing the second driver to transmit a defined quantity of additional pulses at the first defined frequency level. The method also includes, after the additional pulses are transmitted, causing the second driver to enter the electrical idle state.

In an example, the first defined frequency level is a lower frequency as compared to the second defined frequency level, where the second defined frequency level can be a normal data rate. In another example, the defined impedance level is a level that indicates the receiver device is ready to receive the data. Further, the communication can be via an optical fiber cable.

In an example, the device is a downstream device, the first driver is a downstream driver, the second driver is an upstream driver, and the transmitter is an upstream transmitter. In another example, the device is an upstream device, the first driver is an upstream driver, the second driver is a downstream driver, and the transmitter is a downstream transmitter.

According to some implementations, at least one defined criterion is a defined pulse duration. Alternatively, or additionally, at least one defined criterion is a defined duty cycle. In some implementations, two or more defined criterion are utilized, where the two or more defined criterion comprise both a defined pulse duration and a defined duty cycle.

Another embodiment relates to a signaling system that includes a first driver that pulses at a first defined frequency level based on receipt of a first signal that indicates an impedance level of a component satisfies a defined impedance level. Also included is a transimpedance amplifier that, based on a second determination that a number of pulses received at the first defined frequency level satisfy a defined number of pulses and at least one defined criterion, sends a second signal to a second driver that causes a second impedance level of the second driver to match the defined impedance level, and causes the second driver to enter an electrical idle state. Further, based on the second impedance level of the second driver matching the defined impedance level, a transmitter conveys high-speed data to the component. The high-speed data is conveyed at a second defined frequency level, via an optical fiber link. In an example, the at least one defined criterion is at least one of a defined duty cycle and a defined pulse duration. The transmitter and the transimpedance amplifier can be electrically isolated from the first driver and the second driver via the optical fiber link.

According to an implementation, prior to causing the second impedance level of the second driver to match the defined impedance level and based on the second determination, the second driver transmits a defined quantity of additional pulses at the first defined frequency level. Further, after the additional pulses are transmitted, the second driver enters the electrical idle state.

The first defined frequency level is a lower frequency as compared to the second defined frequency level according to an example. By way of example, the second defined frequency level can be a normal data rate. In some implementations, the defined impedance level is a level that indicates the component is ready to receive the data. Further, communication can be via an optical fiber cable.

In an example, the component is a downstream component, the first driver is a downstream driver, the second driver is an upstream driver, and the transmitter is an upstream transmitter. According to another example, the component is an upstream component, the first driver is an upstream driver, the second driver is a downstream driver, and the transmitter is a downstream transmitter.

Further, in some implementations, the first driver pulses at a first defined duty cycle and the first defined frequency level based on the receipt of the signal, and wherein the transimpedance amplifier causes the second impedance level of the second driver to match the defined impedance level based on the first defined duty cycle satisfying a defined duty cycle.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Figure 1:
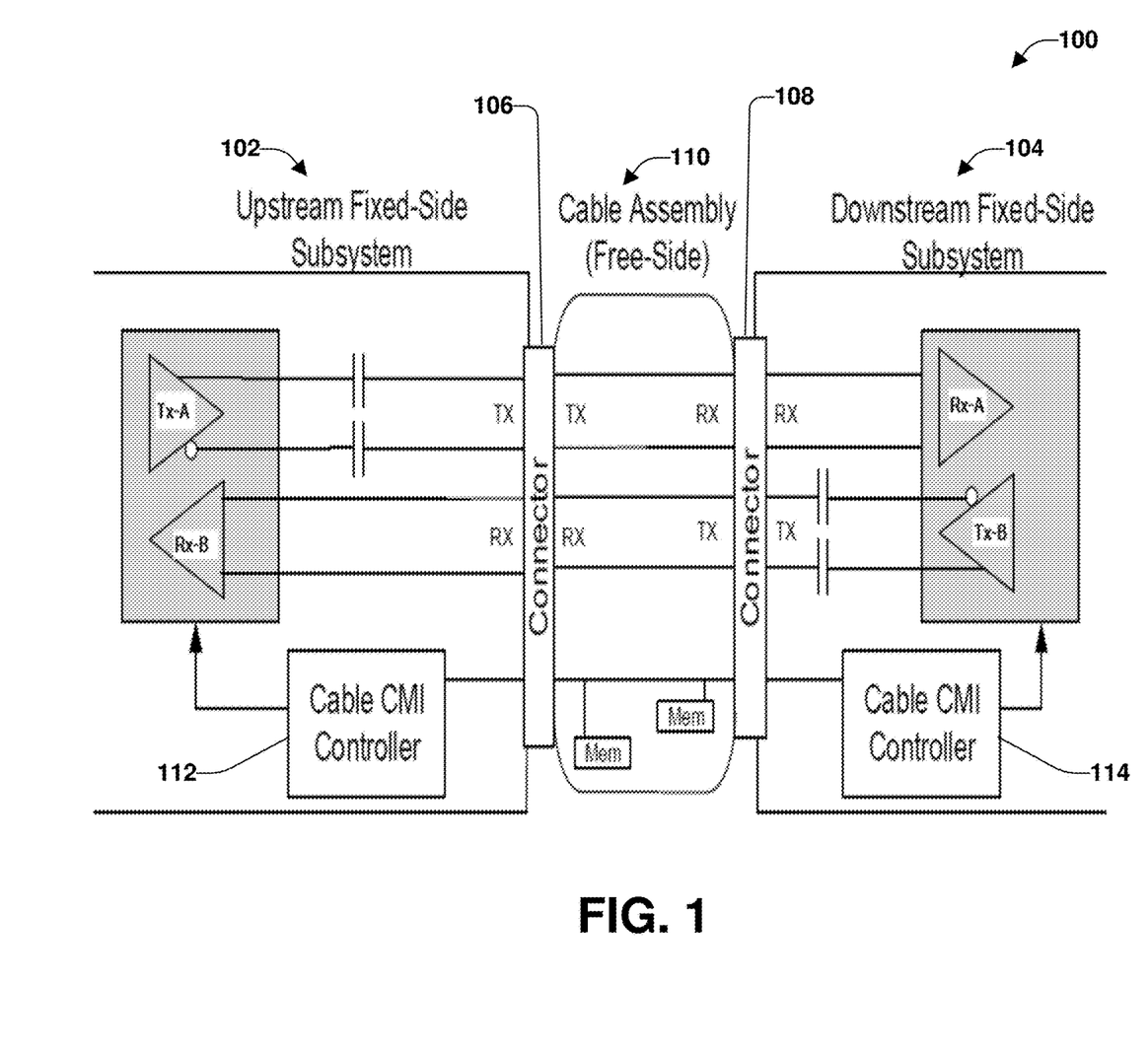
FIG. 1 illustrates an example, non-limiting, system that uses a peripheral component interconnect express (PCIe) signaling procedure over a copper backplane.

FIG. 1 illustrates an example, non-limiting, system 100 that uses a peripheral component interconnect express (PCIe) signaling procedure over a copper backplane. Such connection over the copper backplane has been defined in the PCIe standard. The system 100 includes an upstream fixed-side subsystem 102 and a downstream fixed-side subsystem 104, that are connected, via respective connectors 106 and 108, to a cable assembly (free-side) 110.

The system 100 includes two links for transmission of data, one in each direction, that include a transmitter (TX) and a receiver (RX). Thus, a first link includes a first transmitter (Tx-A) and a first receiver (Rx-A). A second link includes a second transmitter (Tx-B) and a second receiver (Rx-B). The first link and second link are connected via copper cables, which for each link is a twisted pair of copper cables. It is noted that the identification of first, second, and so on as used herein is for purposes of distinguishing the transmitters and/or receivers from one another and is not meant to indicate a particular order of the transmitters and/or receivers.

In further detail, in the system 100, high-speed signals can traverse the copper cable from Tx-A to Rx-A (left to right in FIG. 1) and from Tx-B to Rx-B (right to left in FIG. 1). If the transmitter (e.g., Tx-A or Tx-B) has knowledge that the receiver (e.g., Rx-A or Rx-B) is present and available to receive the information, such information is sent. Accordingly, there is a handshake that occurs between the upstream components and downstream components. In the system, 100, the Tx-A can directly talk to the Rx-A and receiver detection can be directly performed. In a similar manner, the Tx-B can directly talk to the Rx-B and receiver detection can be directly performed.

In the system 100, two major detections take place in order for the respective links to pass high-speed data. The first is termed receiver detection or "Rx detect." This includes the transmitter (e.g., Tx-A or Tx-B) recognizing the presence of the receiver (e.g., Rx-A or Rx-B) on the other side of the link. The recognition can be via a change in impedance at the input of the receiver (e.g., Rx-A or Rx-B), from high impedance to a defined differential impedance (e.g., a one hundred-ohm differential impedance). The second condition is termed "electrical idle." This is a state where, in the absence of data at the input of either the transmitter (e.g., Tx-A or Tx-B) or the receiver (e.g., Rx-A or Rx-B), the device mutes its output data stream and sets the common mode voltage to a value defined in the standard. When normal data is present at the input of the device, it will be detected, and the device will exit the "electrical idle" state, allowing data to pass through.

In addition, the PCIe standard has a cable controller on each end, which are illustrated as a cable management interface (CMI) controller 112 associated with the upstream fixed-side subsystem 102 and a CMI controller 114 associated with the downstream fixed-side subsystem 104. Also illustrated are respective memories (Mem). The CMI controllers (e.g., the CMI controller 112, the CMI controller 114) allow low speed auxiliary signals to be passed through the backplane. The auxiliary signals include cable present, cable wake, both passed upstream, and cable platform reset, cable power on, both passed downstream. In addition, there is 100 MHz reference clock. It is not necessary for these auxiliary signals to be passed through the optical fiber.

To address the above as well as other issues, provided herein is an architecture for allowing transmission of PCIe compliant signals over optical fiber. This architecture allows for "Rx detect" to be passed from a downstream receiver to the upstream transmitter, and also pass "Rx detect" from an upstream receiver to a downstream transmitter, via a laser driver and a transimpedance amplifier (TIA), despite the fiber being unidirectional. "Electrical idle" is also supported with the architecture. The disclosed embodiments are also agnostic to the sequencing of power-up on the two ends of the link.

Figure 2:
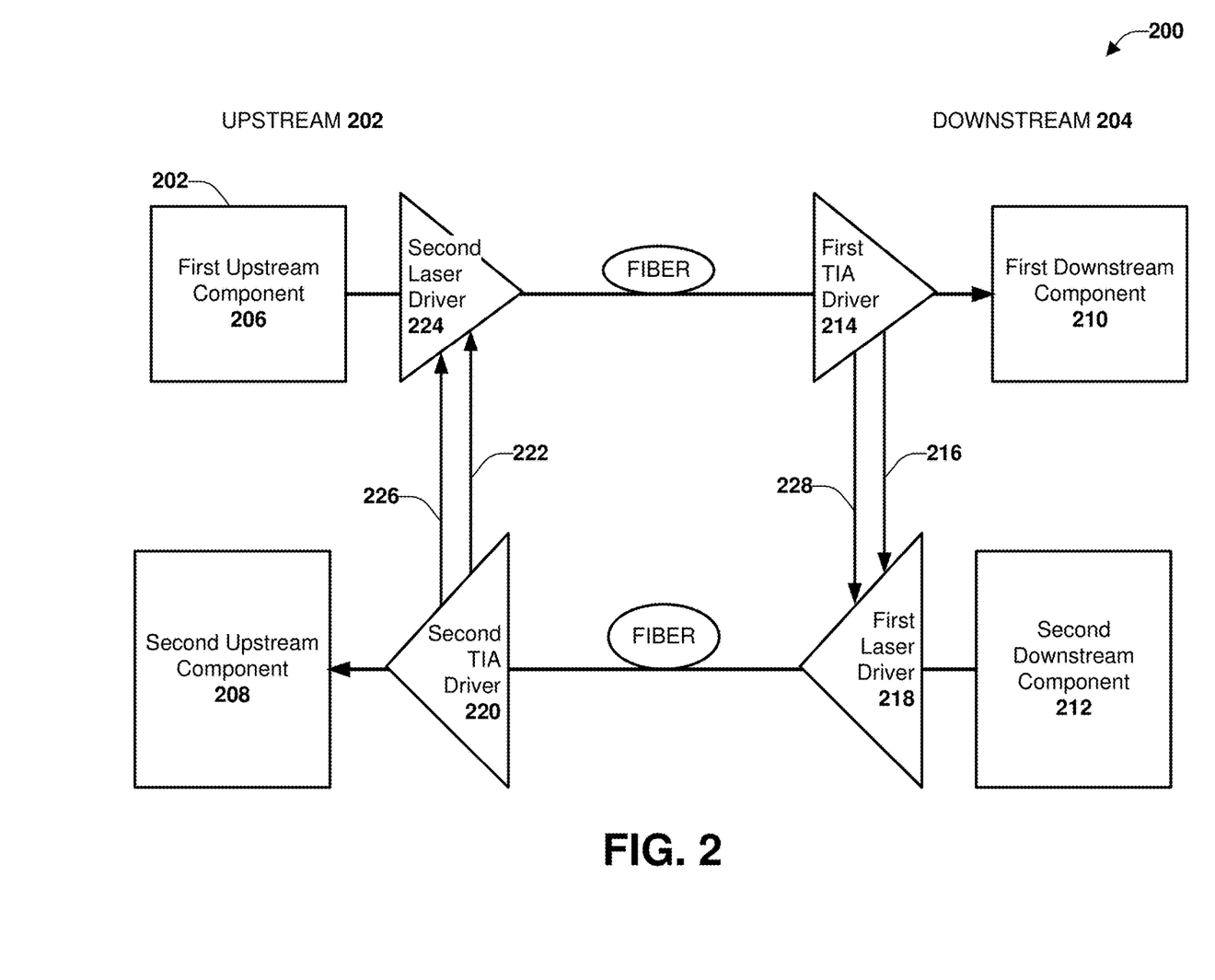
FIG. 2 illustrates an example, non-limiting, system for signal detection and information conveyance over optical fiber in accordance with one or more embodiments described herein

FIG. 2 illustrates an example, non-limiting, system 200 for signal detection and information conveyance over optical fiber in accordance with one or more embodiments described herein. The system 200 can comprise one or more of the components and/or functionality of the system 100. It is noted that although the devices from FIG. 1 are not illustrated in FIG. 2 for purposes of simplicity, such devices are still included in the system 200. As discussed above, information exchange using a copper backplane is straightforward as the various components can communication directly with one another. However, such information exchange via optical fiber is not possible because the components are electrically isolated from one another.

As illustrated, a communication link includes an upstream side 202 and a downstream side 204. The upstream side 202 includes a first upstream component 206 and a second upstream component 208. Further, the downstream side 204 includes a first downstream component 210 and a second downstream component 212. Although discussed with respect to two upstream components and two downstream components, various implementations can include more than two upstream components and/or more than two downstream components. Further, it is noted that the identification of first, second, and so on as used herein is for purposes of distinguishing elements that have a same name from one another and is not meant to indicate a particular order of the elements.

In an example, the first downstream component 210 has information for the first upstream component 206. Accordingly, a first TIA driver 214 pulses to determine whether the first downstream component 210 has information (e.g., is present (or exists) and is at a defined impedance level). If the detection by the first TIA driver 214 is positive, the first TIA driver 214 sets a first signal 216 to a defined first value (e.g., changes the value from "0" to "1" (or vice versa), changes from a low value to a high value (or vice versa)). The defined first value of the first signal 216 is indicative of an instruction to a first laser driver 218 to begin to pulse slowly across the fiber (toward the upstream side 202).

A second TIA driver 220 can receive information related to the pulsation by the first laser driver 218 (via the fiber) and can count the number of pulses detected. Upon or after the second TIA driver 220 determines that a predetermined number of pulses at a defined frequency, a defined duty cycle, or both the defined frequency and the defined duty cycle have been detected, a second signal 222 is set to the defined first value (or another value). The second signal 222 is transmitted from the second TIA driver 220 to a second laser driver 224.

In a similar manner, the second TIA driver 220 can detect whether the second upstream component 208 is present (e.g., exists) and is at a defined impedance level (which can be the same impedance level as the first downstream component 210 as discussed above, or a different impedance level). Upon or after the second TIA driver 220 makes a positive determination, the second TIA driver 220 sets a third signal 226 to a defined first value (e.g., changes the value from "0" to "1" (or vice versa), changes from a low value to a high value (or vice versa)). The defined first value of the third signal 226 provides an instruction to the second laser driver 224 to begin to pulse slowly across the fiber.

The first TIA driver 214 can receive, via the fiber, an indication of the pulsation of the second laser driver 224 and can count the number of pulses. Upon or after the first TIA driver 214 determines a predetermined number of pulses at a defined frequency, a defined duty cycle, or both the defined frequency and the defined duty cycle have been detected, a fourth signal 228 is set to the defined first value (or another value). The fourth signal 228 is transmitted from the first TIA driver 214 to the first laser driver 218.

Upon or after the second signal 222 and/or the fourth signal 228 go high, based on instructions, the second laser driver 224 and/or the first laser driver 218 pulse a defined number of additional times. Upon or after completion of the additional pulses, the respective drivers (e.g., the first laser driver 218, the second laser driver 224) can enter electrical idle mode and set their respective input impedance level to a low impedance level (as compared to an initial high impedance level). According to an implementation, the impedance level of the respective drivers can be the same (or similar) impedance level as the respective component being detected (e.g., impedance matching).

The change in the respective impedance levels provides respective signal information to the second downstream component 212 and/or the first upstream component 206. The signal information can include any signal, on the upstream or downstream, that needs to go from one side to the other side. Different frequencies, different duty cycles, and/or a different number of pulses can be defined for the respective signal being communicated. It is noted that the following will describe such signals in terms of receiver detection, however, the disclosed embodiments are not limited to receiver detection and various other information can be conveyed among components or devices.

Figure 3:
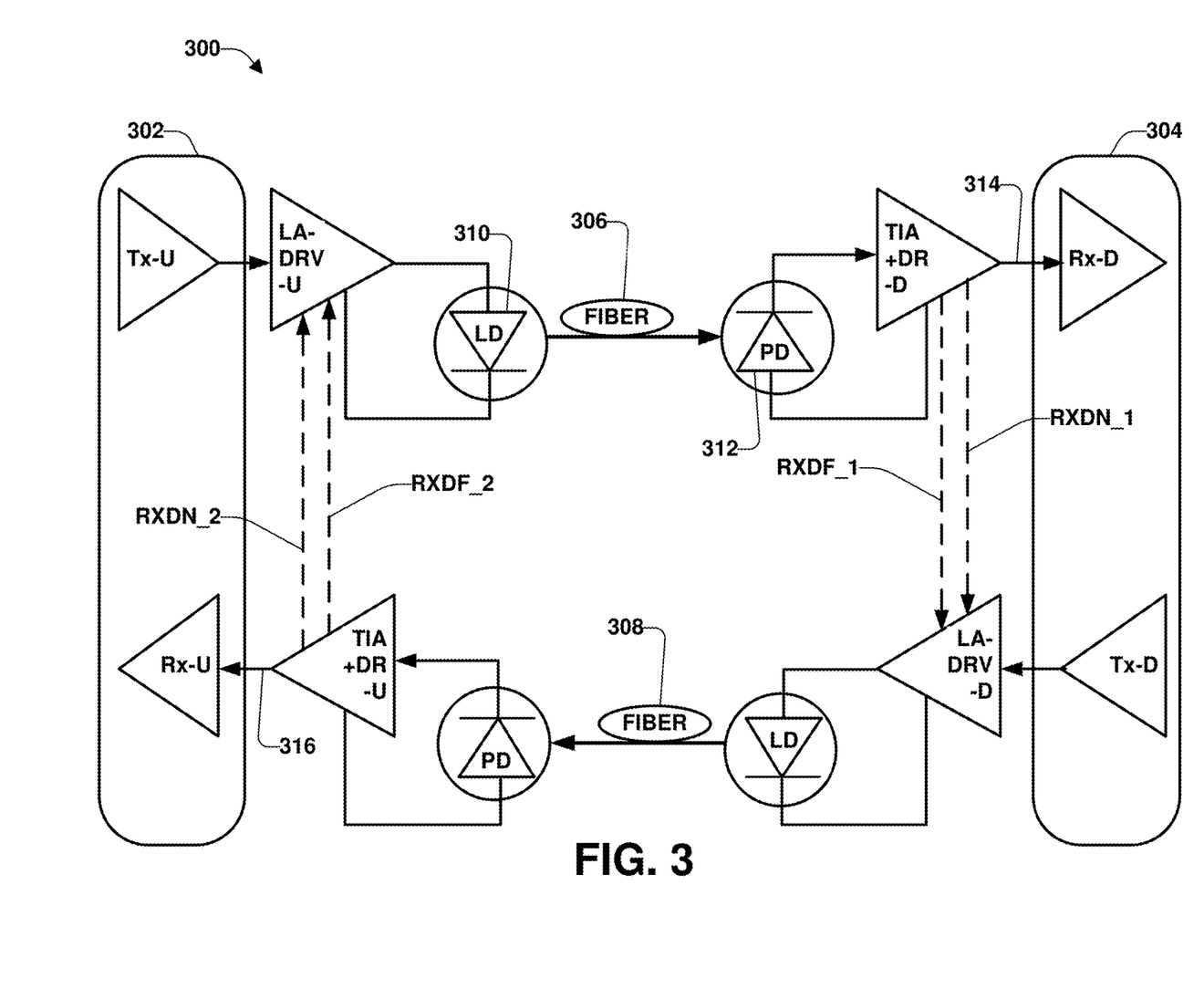
FIG. 3 illustrates an example, non-limiting, system that utilizes a signaling procedure for receiver detection over an optical fiber in accordance with one or more embodiments described herein.

FIG. 3 illustrates an example, non-limiting, system 300 that utilizes a signaling procedure for receiver detection over an optical fiber in accordance with one or more embodiments described herein. Repetitive description of like elements employed in other embodiments described herein is omitted for sake of brevity. In an example, the system 300 can be PCIe compliant over an optical fiber.

The system 300 can comprise one or more of the components and/or functionality of the system 100 and/or the system 200. It is noted that although the devices from FIG. 1 are not illustrated in FIG. 3 for purposes of simplicity, such devices are still included in the system 300. These devices are depicted as an upstream transmitter (Tx-U) and a downstream receiver (Rx-D) in one direction and a downstream transmitter (Tx-D) and an upstream receiver (Rx-U) in the other direction. Although only one channel in each direction is illustrated, various implementations can have more than one channel in each direction. Further, the system 100 may have additional signals that are not part of this implementation. For example 112 and 114 in FIG. 1 are not fully handled by this transmission over optical fiber.

Instead of using a twisted pair of copper cables (as per the system 100 of FIG. 1), the system 300 of FIG. 3 utilizes an optical link (e.g., a fiber optic cable or optical fiber). An upstream side 302 includes the Tx-U (e.g., the first upstream component 206) and the Rx-U (e.g., the second upstream component 208). A downstream side 304 includes the Rx-D (e.g., the first downstream component 210) and the Tx-D (e.g., the second downstream component 212). In the system 300, optical fiber, which is typically a non-conductor, is used instead of copper. Therefore, there is communication isolation from one side (e.g., the upstream side 302) to the other side (e.g., the downstream side 304).

The optical link is present in between each transmit and receive (Tx/Rx) pair, which includes an uplink stream and a downlink stream. For example, a first Tx/Rx pair includes the Tx-U and Rx-U and a second Tx/Rx pair includes the Tx-D and the Rx-D.

Between the upstream side 302 and the downstream side 304 is a fiber optic cable, illustrated as a fiber 306 for the data transmission from the Tx-U to the Rx-D, and a fiber 308 for the data transmission from Tx-D to Rx-U. Since fiber is being utilized, various transformations of the signals are performed. The following will discuss the process for sending data from the Tx-U to the Rx-D. A similar process can be utilized for sending data from the Tx-D to the Rx-U.

The Tx-U sends an electrical signal, which needs to be converted from an electrical signal to an optical signal. A laser driver or chip drives the electrical signal to a laser diode (LD 310) that converts the signal to the optical signal that traverses the fiber 306. A photo diode (PD 312) converts the optical signal (or light) to a small current, and a chip in a downstream TIA driver (e.g., TIA+Dr-D) converts the small current to voltage, which is amplified, so that it can go to the receive downstream (Rx-D).

When fiber is utilized (instead of copper), the Tx-U can no longer detect the input impedance level of Rx-D anymore. Therefore, the system (which can be implemented as a chip) has a circuit that allows the Tx-U to determine if the receiver (Rx-D) is available and is able to receive data. For example, if it is determined that there is a high impedance at the receiver (Rx-D), it indicates that the receiver is not ready to receive data. However, if a measured impedance level satisfies a defined impedance level, it means that the receiver is available and ready to receive data. Accordingly, receiver detection, indicated at 314 and 316, can be enabled for the system 300 that utilizes a fiber optic cable.

As illustrated, the system 300 also includes respective laser drivers (LA-DRV) on each end, illustrated as LA-DRV-U for the upstream (e.g., the second laser driver 224) and LA-DRV-D for the downstream (e.g., the first laser driver 218). A laser driver can include, but is not limited to a vertical-cavity surface-emitting laser (VCSEL), an electro-absorption modulated laser (EML), a directly modulated laser diode (DML), and a silicon photonic (SiPh) laser driver. Also included are respective TIAs on each end, illustrated as a TIA+DR-U for the upstream (e.g., the second TIA driver 220) and a TIA+DR-D for the downstream (e.g., the first TIA driver 214). In-between each Tx, RX pair are the optical fibers.

In order to comply with the PCIe standard, the TIA+DR-D performs the "Rx detect" (e.g., the receiver detection 314) of Rx-D, and passes that information to the Tx-U, in order to meet one of the conditions for enabling data through the link. However, this presents some challenges, as the fiber is unidirectional, and the impedance of the downstream TIA cannot be determined over fiber. Likewise, Rx-U detection (e.g., the receiver detection 316) by the TIA+DR-U, on chip power-up, should be passed to Tx-D via the laser driver.

Figure 4:
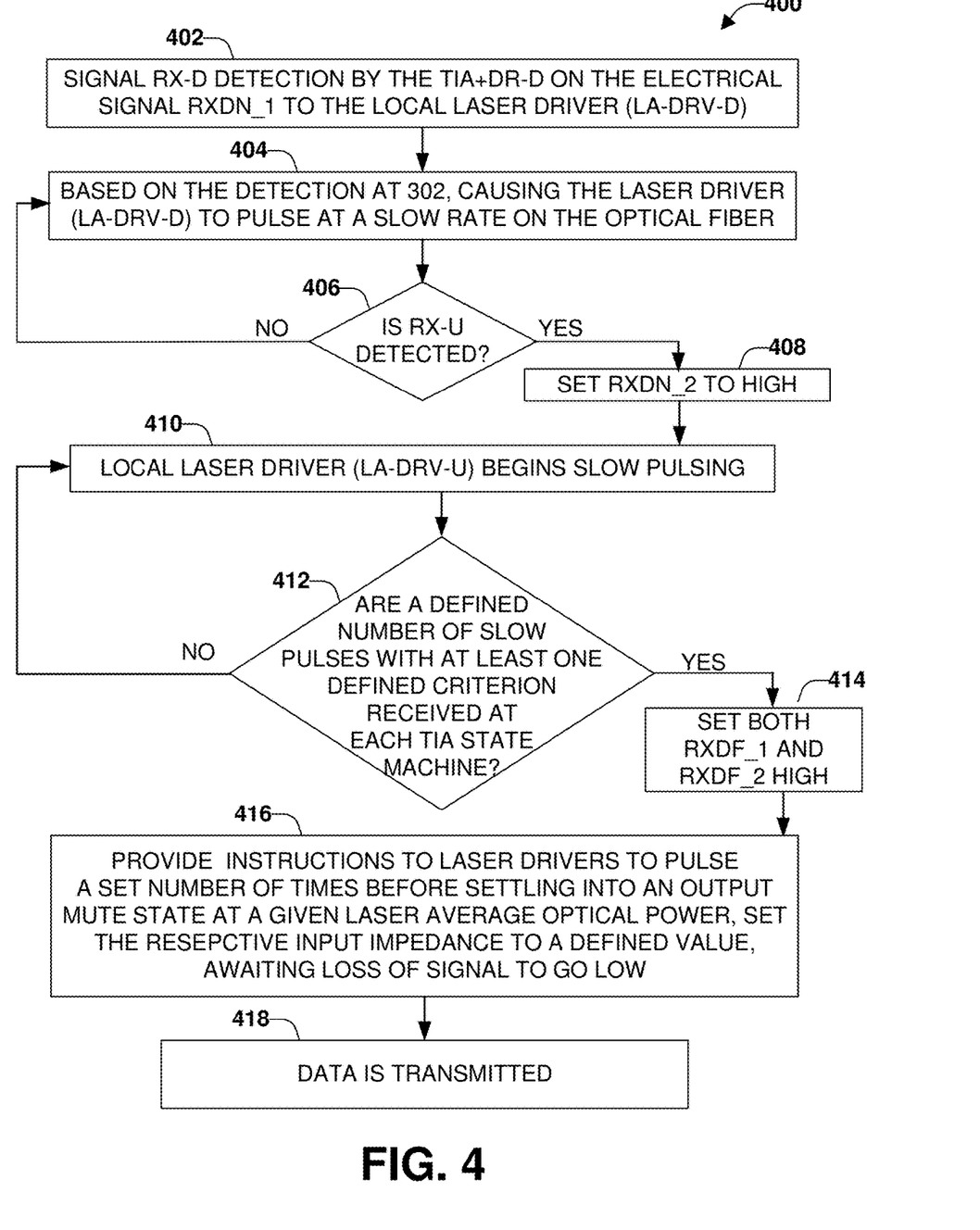
FIG. 4 illustrates an example, non-limiting, flow diagram of a signaling method that facilitates signaling over optical fiber in accordance with one or more embodiments described herein.

In order to pass the "Rx detect" to the Tx on the other end, for example, from Rx-D to Tx-U, a signaling procedure is provided herein, as depicted in FIG. 4, which is an example, non-limiting, flow diagram of a signaling method 400 that facilitates signaling over optical fiber in accordance with one or more embodiments described herein. Repetitive description of like elements employed in other embodiments described herein is omitted for sake of brevity. The method can be implemented by the system 300 of FIG. 3, for example.

At 402, an Rx-D detection (e.g., the receiver detection 314) by the TIA+DR-D is signaled on the electrical signal RXDN_1 (e.g., the first signal 216 of FIG. 2) to the local laser driver (LA-DRV-D). RXDN refers to a receiver detection of a Near device.

This detection then instructs (or forces_ the laser driver (LA-DRV-D) to pulse at a slow rate on the optical fiber, at 404. The pulse continues (e.g., indefinitely) until the TIA driver on the other end of the link (TIA+DR-U) is powered on and Rx-U is detected. Thus, at 406, it is determined whether Rx-U is detected. If it is determined that Rx-U is not detected ("NO"), the method returns to 404 and the laser driver (LA-DRV-D) continues to pulse at a slow rate.

Alternatively, if it is determined at 406 that Rx-U has been detected ("YES"), at 408, RXDN_2 (e.g., the third signal 226) is set high. Upon or after RXDN_2 is set high, at 410, the local laser driver (LA-DRV-U) begins to start slow pulsing also. Upon or after both laser driver state machines (e.g., LA-DRV-D and LA_DRV-U) are pulsing slowly, at 412 a determination is made whether both TIA state machines have detected a defined number of slow pulses that comprise at least one defined criterion. For example, at least one defined criterion can be a defined pulse duration. In another example, at least one defined criterion can be a defined duty cycle. In a further example, both a defined pulse duration and a defined duty cycle can be utilized as defined criteria. Each TIA state machine can perform the determination individually. The defined number of slow pulses can be any number determined not to be confused with regular data. Accordingly, in an example, the defined number of slow pulses at the defined duty cycle can be a number larger than one.

If it is determined at 412 that both TIA state machines have not received, the required or defined number of slow pulses at the defined duty cycle ("NO"), the method returns to 410 and both drivers continue to slowly pulse. However, if the determination at 412 is that both TIA state machines have received the defined number of slow pulses at the defined duty cycle ("YES"), at 414, RXDF_1 and RXDF_2 ((e.g., the fourth signal 228, the second signal 222) depicted by respective dashed lines) are both set high. RXDF refers to a receiver detection of a Far device. It is noted that once RXDF_1 goes high LA-DRV-D pulses a few more times BEFORE the input impedance changes to a defined value. Likewise for RXDF_2 and LA-DRV-U.

At 416, one or more indications are provided to the laser drivers to only slow pulse an additional set number of time (e.g., two more times) before settling into an output mute state at a given laser average optical power, awaiting LOS (loss of signal) to go low, in order for data to be sent over fiber towards the TIA. This change of input impedance of the laser driver is also an indication to Tx-U and Tx-D that the corresponding receivers, Rx-D and Rx-U respectively, have been detected. Once Rx detection has taken place, the TIA will be in electrical idle mode awaiting detection of real data over the optical fiber. The data is received at 418. As mentioned earlier, upon or after RXDF_1 and RXDF_2 go high, slow pulsing continues for only a few more cycles (e.g., two more cycles, five more cycles, and so on), at which time both ends of the link will be in mute or electrical idle mode awaiting real data. It is not important which end of the link powers up first as the system is agnostic to which laser driver starts pulsing first.

It is noted that, the RXDN_x will suggest the LA-DRV to generate special pulses. Further, the RXDF_x will set the Input Termination of the LA-DRV after one or more defined parameters are satisfied (e.g., a defined number of additional slow pulses). Thus, the input termination does not immediately occur after and RXDF_x is set high. It is noted that "x" is an integer and denotes the identification of the respective signal. For example, in FIG. 3 the signals are identified as RXDN_1, RXDN_2, RXDF_1, and RXDF_2. However, the disclosed embodiments are not limited to only two of each signal.

Figure 5:
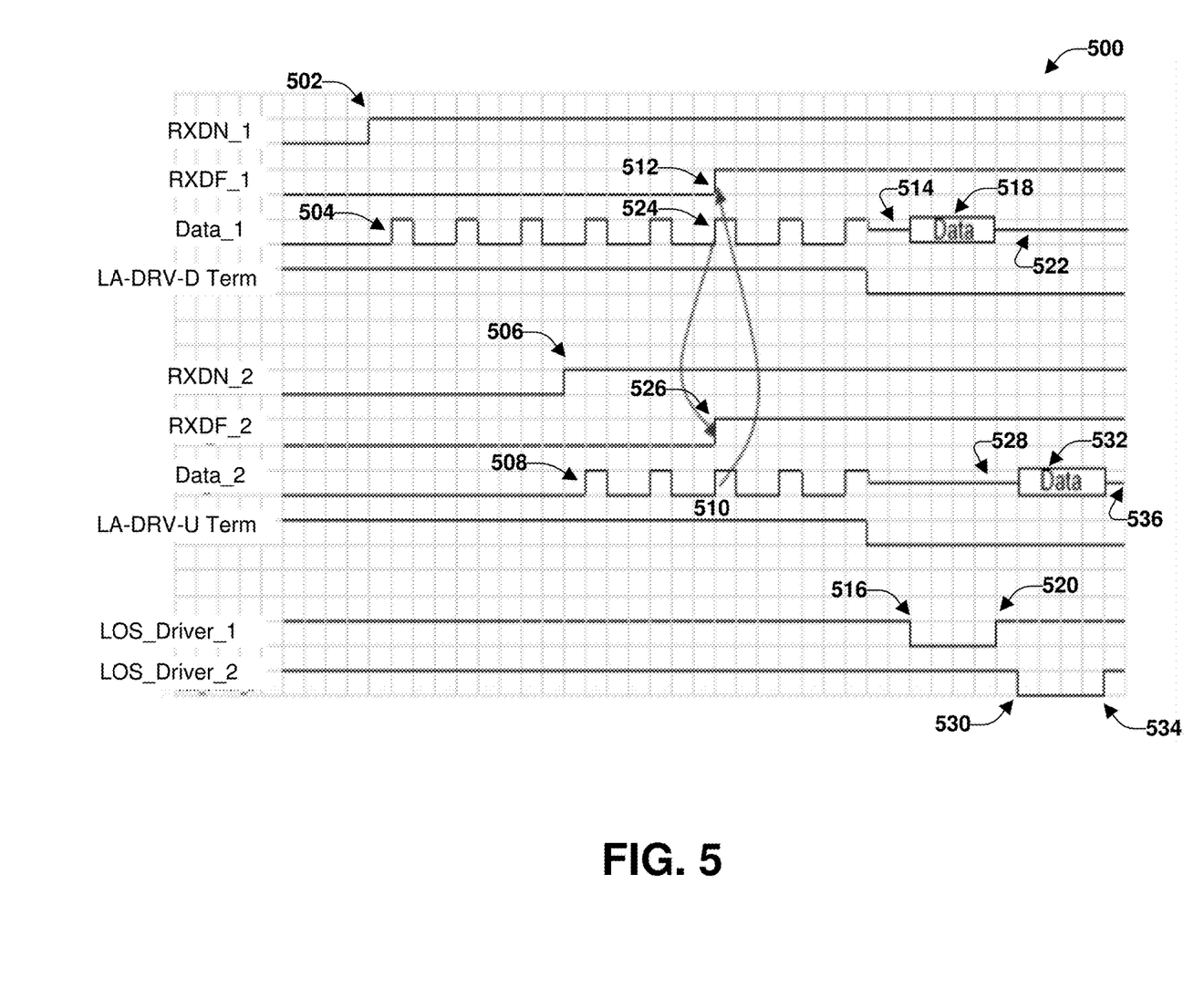
FIG. 5 illustrates an example, non-limiting, timing diagram of handshaking of a laser driver and transimpedance amplifier and for receiver detection transmission and electrical idle in accordance with one or more embodiments described herein.

FIG. 5 illustrates an example, non-limiting, timing diagram 500 of handshaking of a laser driver and a TIA driver and for RX_Detect Transmission and electrical idle in accordance with one or more embodiments described herein. Repetitive description of like elements employed in other embodiments described herein is omitted for sake of brevity.

The timing diagram 500 details the timing associated with the elements of FIG. 2 and the signaling method 400 of FIG. 4. However, other timings can be utilized with the disclosed embodiments.

In an example, RXDN_1 is detected (e.g., goes high at 502). Upon or after RXDN_1 goes high, Data_1 begins to pulse (at 504) at a slow speed. Data_1 can continue to pulse indefinitely, since it is waiting for Data_2 pulses so that the TIA can count those pulses. Upon or after RXDN_2 is detected (e.g., goes high at 506), Data-2 begins to slowly pulse (at 508).

Upon or after two slow pulses (for this example) having a defined duty cycle are detected (as indicated at 510), RXDF_1 goes high (at 512). Upon or after RXDF_1 goes high, a defined number of pulses will continue to be generated, then Data_1 enters mute state (indicated at 514). In the example of FIG. 5, there are three more pulses before entering the mute state, however, another number of pulses can be utilized. Further, upon or after LOS_Driver_1 goes low (at 516), Data is transmitted (at 518). Upon or after data transmission is complete, the LOS_Driver_1 goes high (at 520) and Data_1 goes back into the mute state (at 522) waiting for data.

In a similar manner, upon or after a defined number of pulses are detected on Data_1 (at 524), RXDF_2 goes high (at 526) and a defined number of pulses are generated (in this case 3), after which RXDF_2 enters the mute state (at 528) after it is determined that no high-speed data is available. Upon or after LOS_Driver 2 goes low (at 530), data is transmitted (at 532). Upon or after data transmission is complete, the LOS_Driver_2 goes high (at 534) and Data_2 goes back into the mute state (at 536) waiting for data.

Figure 6:
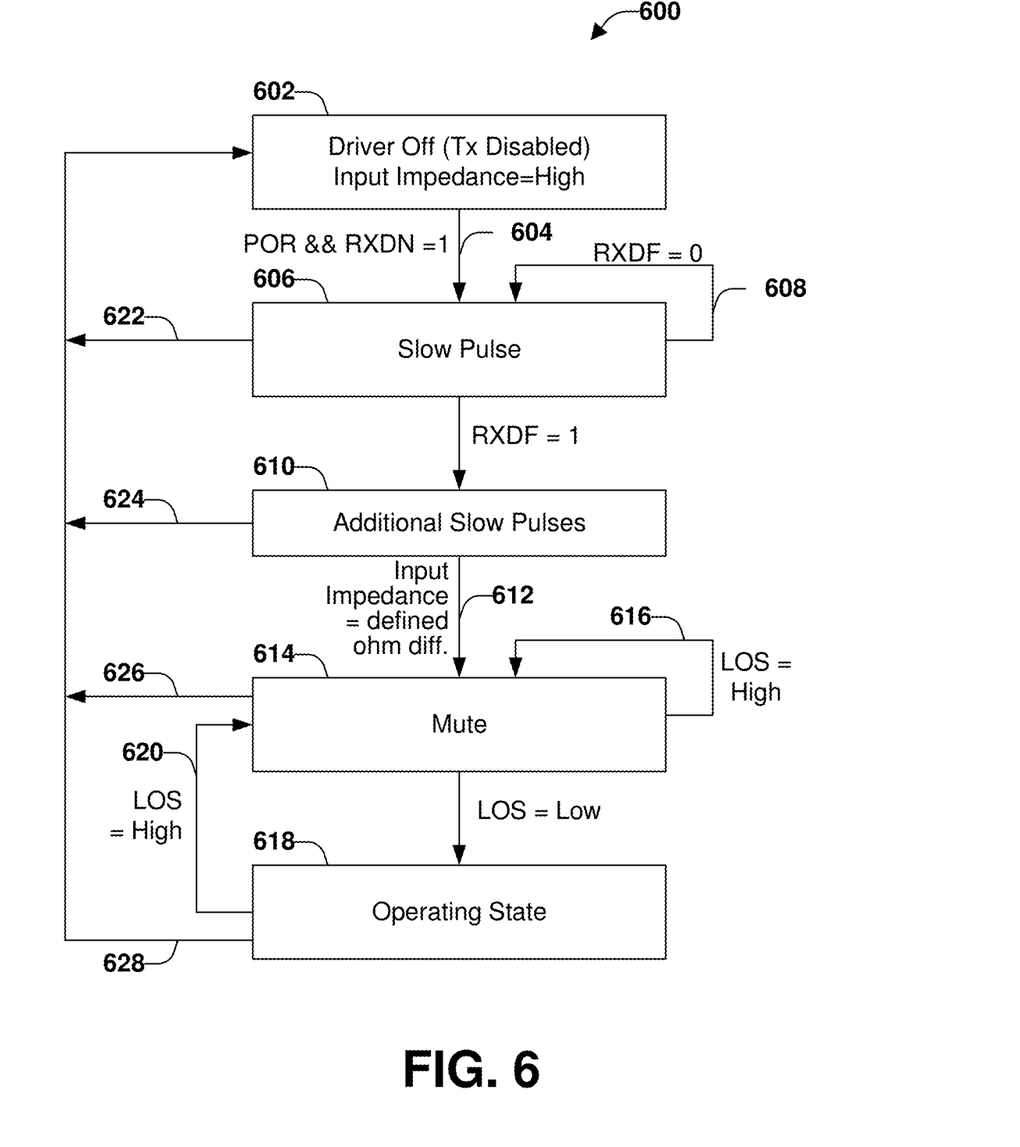
FIG. 6 illustrates an example, non-limiting, flow diagram of a signaling method that facilitates operation of a laser driver (Tx) for signaling over fiber in accordance with one or more embodiments described herein.

FIG. 6 illustrates an example, non-limiting, flow diagram of a signaling method 600 that facilitates operation of a laser Drive (Tx) for signaling over fiber in accordance with one or more embodiments described herein. Repetitive description of like elements employed in other embodiments described herein is omitted for sake of brevity.

The signaling method 600 is, for example, a laser Driver (Tx) state machine diagram. At 602, the driver is off (e.g., transmit Tx is disabled) and the initial input impedance is high. At 604, the following conditions can be evaluated:

$$POR = 1 \ \&\& \ RXDN\_x = 1$$

where POR is power on reset.

If POR && RXDN=1, the signaling method 600 continues to 606, otherwise, it remains in 602 state. Upon or after the driver is enabled and RXDN_x=1, operation will begin and the slow pulsing will be started, at 606.

In this example, initially the laser Driver (Tx) is pulsing by itself and will continue while RXDF is low (or has a value of "0"), as indicated by line 608.

Upon or after RXDF goes high (or has a value of "1"), the far-end receiver has been detected and a defined number of additional slow pulses are generated, at 610. In an example, there can be 3 additional slow pulses, however, in some implementations, another number of additional slow pulses can be generated after RXDF goes high.

Upon or after the defined number of additional slow pulses are generated, at 612, the input impedance of the driver is set to a defined ohm value, differentially. In a non-limiting example, the defined ohm value can be 100 ohms, however, other values can be utilized. At 614, the mute state is entered and no output data is processed. Provided the Loss of Signal (LOS) is high (e.g., there is no data being transmitted by the driver), the mute state is continued, at 616. During the mute state there are no slow pulses nor high-speed data being transmitted.

When it is determined that normal high-speed data starts to arrive (e.g., is going into the driver), the LOS goes low and an operating state is entered, at 618. If data is no longer received (e.g., LOS goes high as indicated at 620), the mute state (e.g., electrical idle) is once again entered at 614.

As indicated by arrows 622, 624, 626, and 628, at various times there can be one or more conditions that cause a reset of the process. If there is no reset, upon or entering the mute state 614 and/or the operating state 618, the signaling method 600 can toggle between the operating state 618, also referred to as a normal state, and the mute state 614, depending on whether or not there is data (e.g., the status of LOS).

Conditions that can cause a need to reset the process can include, for example, a software reset (Software Reset=1), a power on reset (POR=0), a channel disablement (e.g., CH enable=0), a fault state, and so on.

Figure 7:
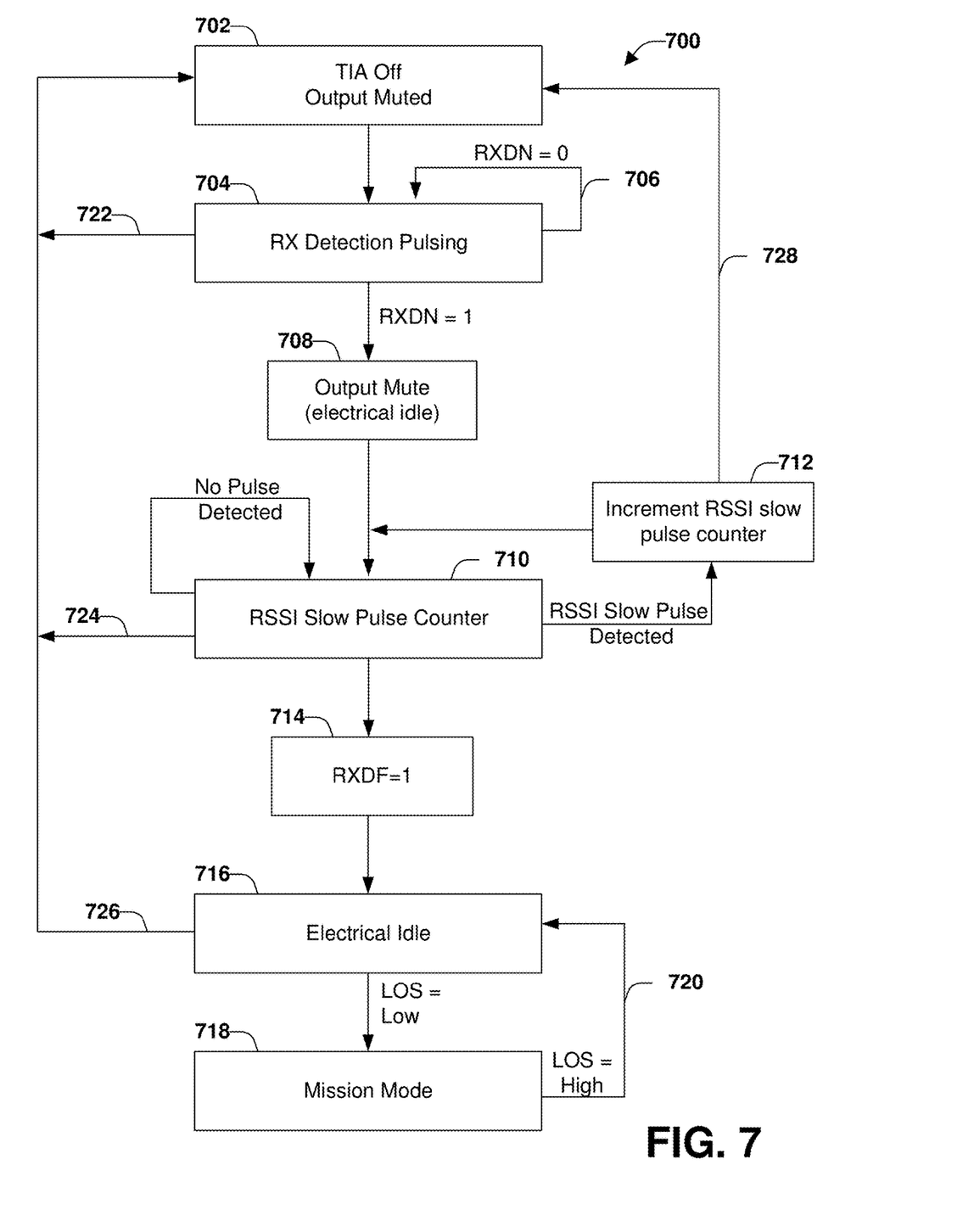
FIG. 7 illustrates an example, non-limiting, flow diagram of a signaling method that facilitates operation of a transimpedance amplifier (Rx) for signaling over fiber in accordance with one or more embodiments described herein.

FIG. 7 illustrates an example, non-limiting, flow diagram of a signaling method 700 that facilitates operation of a TIA (Rx) for signaling over fiber in accordance with one or more embodiments described herein. Repetitive description of like elements employed in other embodiments described herein is omitted for sake of brevity. The signaling method 700 is, for example, a TIA (Rx) state machine diagram.

At 702, the TIA is off and the output is muted. Upon POR the TIA output starts pulsing in order to perform Rx detection, at 704. RXDN is low for the duration this period, as indicated at 706. Once the receiver is detected the TIA sets RXDN high. Upon or after RXDN goes high (or has a value of "1"), the output returns to a mute state at 708. The TIA remains in electrical idle mode.

At 710, a determination is made whether one or more incoming pulses that satisfy at least one defined criterion have been detected. At least one defined criterion can be a defined duty cycle and/or a defined pulse width. If no pulse satisfying at least one defined criterion is detected, the process will cycle at 710. However, if a pulse that satisfies at least one defined criterion is detected, a receiver signal strength indicator (RSSI) photodiode current monitor slow pulse counter is incremented, at 712 and the method returns to 710. Based on detection of another pulse satisfying the defined criterion being detected (e.g., a next pulse or a subsequent pulse), the RSSI slow pulse counter can be incremented again at 712 and the signaling method 700 returns to 710. This process can be repeated until it is determined that the RSSI slow pulse counter has been satisfied. However, if one or more different pulses (that do not have at least one defined criterion) are received before the RSSI slow pulse counter has reached the defined quantity of pulses, the RSSI counter can be reset (e.g., returned to zero).

Upon or after the RSSI slow pulse counter has been satisfied, RXDF can be forced high (e.g., to "1"), at 714. The electrical idle state is entered, at 716, and from this point the signaling method 700 waits for LOS detection (e.g., the detection of high-speed data). Thus, when LOS goes low (e.g., switches from high to low, switches from "1" to "0"), mission mode is entered, at 718, and the high-speed data can be received until LOS goes high again, as indicated at 720.

As indicated by arrows 722, 724, 726, and 728, at various points there can be a condition that causes a need to reset the process. If there is no reset, upon or entering the electrical idle state 716, the signaling method 700 can toggle between the mission mode (718) and the electrical idle state (716) depending on whether or not there is data (e.g., the status of LOS).

Conditions that can cause a need to reset the process can include, for example, a software reset (Software Reset=1), a power on reset (POR=0), a channel disablement (e.g., CH enable=0), and so on.

Figure 8:
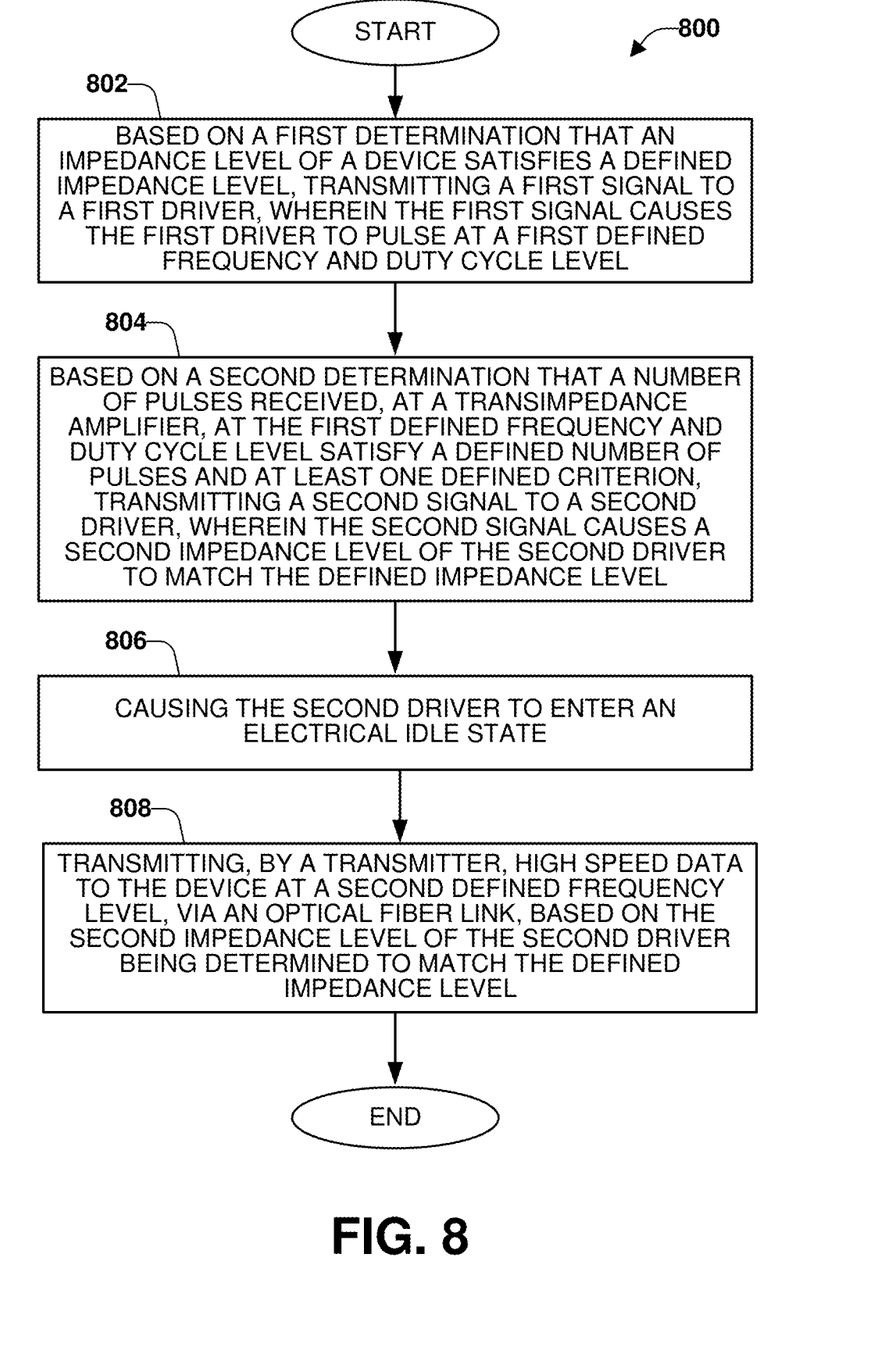
FIG. 8 illustrates an example, non-limiting, flow diagram of a method that facilitates signal detection and information conveyance over optical fiber.

FIG. 8 illustrates an example, non-limiting, flow diagram of a method 800 that facilitates signal detection and information conveyance over optical fiber. The method can be implemented by the system 200 of FIG. 2 and/or the system 300 of FIG. 3.

Based on a first determination that an impedance level of a device satisfies a defined impedance level, at 802, a first signal is transmitted to a first driver. The first signal causes the first driver to pulse at a first defined frequency level.

Based on a second determination that a number of pulses received, at a transimpedance amplifier, at the first defined frequency level satisfy a defined number of pulses and at least one defined criterion, at 804 a second signal is transmitted to a second driver. The second signal causes a second impedance level of the second driver to match the defined impedance level, provided the near-end receiver is also detected. In addition, at 806, the second driver enters an electrical idle state.

At 806, a transmitter sends high-speed data to the device at a second defined frequency level, via an optical fiber link, based on the second impedance level of the second driver being determined to match the defined impedance level.

Described herein is a handshaking procedure between a downstream receiver and an upstream transmitter, as well as a downstream transmitter and an upstream receiver. In a non-limiting example, the downstream receiver can be a transimpedance amplifier (TIA) and the upstream transmitter can be a laser driver, however, the disclosed embodiments are not limited to this implementation. The handshaking procedure discussed herein can be accomplished in the optical domain, over fiber, to allow Peripheral Component Interconnect Express (PCIe) compliant serial signals to be sent over the fiber. Since fiber is uni-directional, conventional methods for receiver detection over a copper backplane cannot be used. The disclosed embodiments allow for the receiver detection to be passed upstream via the fiber link in the opposite direction, and also allows for electrical idle mode to be set correctly. In turn these two signals are necessary for the operation of peripheral component interconnect express (PCIe) and allow for the introduction of fiber connections in the link.

Methods that can be implemented in accordance with the disclosed subject matter will be better appreciated with reference to the above flow charts. While, for purposes of simplicity of explanation, the methods are shown and described as a series of acts or blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical, optical, and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

Other than in the operating examples, if any, or where otherwise indicated, all numbers, values and/or expressions referring to parameters, measurements, conditions, etc., used in the specification and claims are to be understood as modified in all instances by the term "about."

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A fiber optic communication detection method, comprising:
   determining, at a first transimpedance amplifier (TIA), that an impedance level of a device satisfies a defined impedance level;
   transmitting, from the first TIA to a first driver, a first signal, wherein the first signal causes the first driver to pulse over an optical fiber at a first defined frequency level;
   determining, at a second TIA driver connected to the optical fiber, that a number of pulses received at the first defined frequency level satisfy a defined number of pulses and at least one defined criterion,
   transmitting, from the second TIA driver, a second signal to a second driver, wherein the second signal causes a second impedance level of the second driver to match the defined impedance level, and
   causing the second driver to enter an electrical idle state; and
   transmitting, by a transmitter, high-speed data to the device at a second defined frequency level, via an optical fiber link, based on the second impedance level of the second driver being determined to match the defined impedance level.

2. The fiber optic communication detection method of claim 1, further comprising:
   prior to the causing the second impedance level of the second driver to match the defined impedance level and based on the second determination, causing the second driver to transmit a defined quantity of additional pulses at the first defined frequency level; and
   after the additional pulses are transmitted, causing the second driver to enter the electrical idle state.

3. The fiber optic communication detection method of claim 1, wherein the first defined frequency level is a lower frequency as compared to the second defined frequency level.

4. The fiber optic communication detection method of claim 1, wherein the defined impedance level is a level that indicates the device is ready to receive the data.

5. The fiber optic communication detection method of claim 1, wherein communication is via an optical fiber cable.

6. The fiber optic communication detection method of claim 1, wherein the device is a downstream device, the first driver is a downstream driver, the second driver is an upstream driver, and the transmitter is an upstream transmitter.

7. The fiber optic communication detection method of claim 1, wherein the device is an upstream device, the first driver is an upstream driver, the second driver is a downstream driver, and the transmitter is a downstream transmitter.

8. The fiber optic communication detection method of claim 1, wherein the at least one defined criterion is a defined pulse duration.

9. The fiber optic communication detection method of claim 1, wherein the at least one defined criterion is a defined duty cycle.

10. The fiber optic communication detection method of claim 1, wherein the transimpedance amplifier is electrically isolated from the first driver and the second driver via the optical fiber link.

11. A signaling system, comprising:
- a first transimpedance amplifier (TIA) driver;
- a first driver configured to receive a signal from the first TIA driver;
- a second TIA driver connected via a fiber optic cable to the first driver;
- a second driver configured to receive a signal from the second TIA driver;
- wherein the a first driver is configured to pulse at a first defined frequency level when a first signal from the first TIA indicates that an impedance level of a component satisfies a defined impedance level;
- wherein the second TIA, based on a second determination that a number of pulses received at the first defined frequency level satisfy a defined number of pulses and at least one defined criterion, is configured to send a second signal to a second driver that causes a second impedance level of the second driver to match the defined impedance level, and causes the second driver to enter an electrical idle state; and
- a transmitter that, based on the second impedance level of the second driver matching the defined impedance level, is configured to transmit high-speed data to the component, wherein the high-speed data is transmitted at a second defined frequency level, via an optical fiber link.

12. The signaling system of claim 11, wherein the at least one defined criterion is at least one of a defined duty cycle and a defined pulse duration.

13. The signaling system of claim 11, wherein
prior to causing the second impedance level of the second driver to match the defined impedance level and based on the second determination, the second driver transmits a defined quantity of additional pulses at the first defined frequency level, and
after the additional pulses are transmitted, the second driver enters the electrical idle state.

14. The signaling system of claim 11, wherein the first defined frequency level is a lower frequency as compared to the second defined frequency level.

15. The signaling system of claim 11, wherein the defined impedance level is a level that indicates the component is ready to receive the data.

16. The signaling system of claim 11, wherein communication is via an optical fiber cable.

17. The signaling system of claim 12, wherein the component is a downstream component, the first driver is a downstream driver, the second driver is an upstream driver, and the transmitter is an upstream transmitter.

18. The signaling system of claim 11, wherein the component is an upstream component, the first driver is an upstream driver, the second driver is a downstream driver, and the transmitter is a downstream transmitter.

19. The signaling system of claim 11, wherein the first driver pulses at a first defined duty cycle and the first defined frequency level based on the receipt of the signal, and wherein the transimpedance amplifier causes the second impedance level of the second driver to match the defined impedance level based on the first defined duty cycle satisfying a defined duty cycle.

20. The signaling system of claim 11, wherein the transmitter and the transimpedance amplifier are electrically isolated from the first driver and the second driver via the optical fiber link.

* * * * *